(12) United States Patent
Gong et al.

(10) Patent No.: US 7,868,560 B2
(45) Date of Patent: Jan. 11, 2011

(54) INVERTER DRIVING CIRCUIT FOR LCD BACKLIGHT

(75) Inventors: Jung Chul Gong, Seoul (KR); Byoung Own Min, Gyunggi-do (KR); Yu Jin Jang, Gyunggi-do (KR); Sang Cheol Shin, Gyunggi-do (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 887 days.

(21) Appl. No.: 11/808,161

(22) Filed: Jun. 7, 2007

(65) Prior Publication Data

US 2007/0285381 A1 Dec. 13, 2007

(30) Foreign Application Priority Data

Jun. 8, 2006 (KR) ...................... 10-2006-0051610

(51) Int. Cl.
*H05B 41/36* (2006.01)
(52) U.S. Cl. .................... 315/291; 315/307; 315/209 R; 363/98; 323/351
(58) Field of Classification Search ................. 315/307, 315/291, 224, 225, 209 R, DIG. 4, DIG. 5, 315/DIG. 7, 276, 312; 363/17, 98; 345/102; 323/351, 282, 283, 284; 327/112, 133
See application file for complete search history.

(56) References Cited

U.S. PATENT DOCUMENTS

| | | | | |
|---|---|---|---|---|
| 5,068,571 A | * | 11/1991 | Schoofs | 315/209 R |
| 5,359,274 A | * | 10/1994 | Bandel | 315/291 |
| 5,493,181 A | * | 2/1996 | Shackle et al. | 315/241 R |
| 5,925,990 A | * | 7/1999 | Crouse et al. | 315/307 |
| 6,037,720 A | * | 3/2000 | Wong et al. | 315/291 |
| 6,847,174 B2 | * | 1/2005 | Franck | 315/209 R |
| 7,049,767 B2 | * | 5/2006 | Wilhelm | 315/291 |

FOREIGN PATENT DOCUMENTS

| KR | 10-2005-0105561 | 11/2005 |
|---|---|---|
| KR | 10-2005-0120873 | 12/2005 |

* cited by examiner

*Primary Examiner*—Douglas W Owens
(74) *Attorney, Agent, or Firm*—McDermott Will & Emery LLP

(57) ABSTRACT

An inverter driving circuit for an LCD is switched on/off more stably to improve heating radiation characteristics and drive efficiency. In the driving circuit, a controller supplies a first driving signal. A level shifter provides a second driving signal. A first delay circuit delays a rising section of the first driving signal to provide the first driving signal. A second delay circuit delays a falling section of the second driving signal to provide the second driving signal. Also, a power switching circuit is provided. The inverter driving circuit for the LCD, when a switching device thereof is turned off, has less current flowing in the switching device, thereby generating less heat. In addition, the inverter driving circuit prevents heat generation caused by current flowing reversely in the switching device, thereby enhancing drive efficiency.

8 Claims, 6 Drawing Sheets

INVERTER DRIVING CIRCUIT FOR LCD BACKLIGHT

CLAIM OF PRIORITY

This application claims the benefit of Korean Patent Application No. 2006-51610 filed on Jun. 8, 2006 in the Korean Intellectual Property Office, the disclosure of which is incorporated herein by reference.

BACKGROUND OF THE INVENTION

1. Field of the Invention

The present invention relates to an inverter driving circuit for a liquid crystal display (LCD) backlight, more particularly, which is switched on/off more stably to improve heat radiation characteristics and drive efficiency.

2. Description of the Related Art

In general, a light crystal display (LCD) does not generate light on its own, thus requiring an additional backlight which adopts as a light source a fluorescent lamp or a light emitting diode.

The fluorescent lamp emits light due to electric discharge caused by a supply voltage applied to the fluorescent lamp. To keep discharging electricity, the fluorescent lamp should have an alternating current flowing therein. Therefore, the backlight requires an inverter for converting a direct current into an alternating current to provide the alternating current to the fluorescent lamp.

FIG. 1 is a block diagram illustrating a conventional LCD backlight inverter.

As shown in FIG. 1, a conventional liquid crystal display (LCD) includes a controller 1, a driver 2, a transformer 3, a backlight 4 and a feedback unit 5.

The controller 1 and the driver 2 constitute an inverter driving circuit for an LCD backlight. The driver 2 switches on/off a power supply of a direct current in response to a driving signal of the controller 1, and provides a first driving current to the transformer 3. The transformer 3 converts the first driving current into a second driving voltage to provide to the backlight 4, thereby allowing a fluorescent lamp of the backlight 4 to emit light.

The backlight 4 should provide a certain amount of light. To this end, the feed back unit 5 measures the second driving voltage to compare with a preset value, and provides a comparison result to the controller 1. In turn, the controller 1 alters the driving signal in response to the comparison result, thereby adjusting the amount of light to be uniform.

FIG. 2 is a block diagram illustrating a conventional inverter driving circuit for an LCD backlight. Referring to FIG. 2, the inverter driving circuit for the LCD backlight includes a controller 10, a level shifter 21, a first delay circuit 22, a second delay circuit 23, a power switching circuit 24. The controller 10 generates a first driving signal S1 of a square wave. The level shifter 21 boosts up and shifts the first driving signal S1 into a second driving signal S2 having a waveform and a phase identical to those of the first driving signal S1. The first delay circuit 22 delays a rising section of the first driving signal S1 and the second delay circuit 23 delays a falling section of the second driving signal S2. The power switching circuit 24 includes an N-channel field effect transistor (FET) 24a switched on/off by the first driving signal S3 delayed by the first delay circuit 22 and a P-channel FET 24b switched on/off by the second driving signal S4 delayed by the second delay circuit 23.

Operation of the conventional inverter driving circuit for the LCD will be described hereunder.

If the first driving signal S1 and the second driving signal S2 identical in waveform and phase are fed to the N-channel FET 24a and the P-channel FET 24b, respectively, ideally, the N-channel FET 24a and the P-channel FET 24b are switched on/off differentially from each other, thus not switched on simultaneously.

However, actually, at a point in time when levels of the first driving signal S1 and the second driving signal S2 are transited, the N-channel FET 24a and the P-channel FET 24b may be turned on simultaneously. This may generate overcurrent, thereby potentially ruining the N-channel and P-channel FETs 24a and 24b.

To prevent the FETs from being destroyed as described above, the first delay circuit 22 delays a rising section of the first driving signal S1 and provides the first driving signal S1 to the N-channel FET 24a. Also, the second delay circuit 23 delays a falling section of the second driving signal S2 and provides the second driving signal S2 to the P-channel FET 24b. This prevents the N-channel and P-channel FETs 24a and 24b from being turned on simultaneously.

On the other hand, a delay in rising sections of the first driving signal S1 and the second driving signal S2 will be described.

In the rising section of the first driving signal S1, the first delay circuit 22 has a first diode 22a reversely biased and current flows in a first resistor 22b. Accordingly, a resistor-capacitor (RC) circuit is formed by the first resistor 22b and an internal capacitor of the N-channel FET 24a. The first delay circuit 22 delays the first driving signal S1 by a delay time determined by a resistance of the first resistor 22b and a capacitance of the internal capacitor and provides a driving signal S3 to the N-channel FET 24a.

In the rising section of the second driving signal S2, the second delay circuit 23 has a second diode 23a forwardly biased and current does not flow in the second resistor 23b, thus not delaying the second driving signal S2.

As a result, the P-channel FET 24b is turned off immediately from "ON" and the N-channel FET 24b is turned on after a predetermined time from "OFF", thereby preventing the N-channel and P-channel FETs 24a and 24b from being turned on simultaneously.

In the meantime, an explanation will be given about the falling sections of the first and second driving signals S1 and S2.

In the falling section of the first driving signal S1, the first delay circuit 22 has the first diode 22a forwardly biased and the current does not flow in the first resistor 22b, thus not delaying the first driving signal S.

In the falling section of the second driving signal S2, the second delay circuit 23 has the second diode 23a reversely biased and the current flows in the second resistor 23b. Accordingly, an RC circuit is formed by the second resistor 23b and an internal capacitor of the P-channel FET 24b. The second delay circuit 23 delays the second driving signal S2 by a delay time determined by a resistance of the second resistor 23b and a capacitance of the internal capacitor and provides a driving signal S4 to the P-channel FET 24b.

As a result, the N-channel FET 24a is turned off immediately from "ON" and the P-channel FET 24a is turned on after a predetermined time from "OFF", thereby preventing the N-channel and P-channel FET 24a and 24b from being turned on simultaneously.

Here, the first diode 22a and the second diode 22b connected in parallel to the first and second resistors 22b and 23b, respectively, when driven forwardly, has an offset voltage of about 0.7V. The first diode 22a is driven forwardly when the first driving signal S1 is at a low level. Thus, the first driving signal S3 delayed by the first delay circuit 22 has a voltage of 0.7 V at a low level. Meanwhile, the second diode 23a is driven forwardly when the second driving signal S2 is at a high level. Thus, the second driving signal S4 delayed by the second delay circuit 23 has a voltage lower than an operating voltage by 0.7V at a high level.

FIG. 3 is a timing diagram illustrating a driving signal of the conventional inverter driving circuit for the LCD backlight.

As shown in FIG. 3, the first driving signal S1 and the second driving signal S2 are square waves having different voltage levels but identical waveforms and phases. The first delay circuit 22 delays the rising section of the first driving signal S1 by a preset time t1 and generates a delayed signal S3. Also, the second delay circuit 22 delays the falling section of the second driving signal S2 by a preset time t2 to generate a delayed signal S4.

The signal S3 has a relatively high voltage V1 of about 0.7V at a low level. On the other hand, the signal S3 has a relatively low voltage V2 that is 0.7V lower than the driving voltage Vcc at a high level. This may cause the N-channel FET 24a and the P-channel FET 24b to operate unstably.

Specifically, in a case where the signal S3 has a relatively high voltage V1 at a low level as described above, a voltage between a gate and a source of the N-channel FET 24a is equal to the voltage V1 and current flows between a drain and the source of the N-channel FET 24a, generating heat.

Moreover, in a case where the signal S4 has a relatively low voltage V2 than the driving voltage at a high level as described above, the voltage between a drain and a gate of the P-channel FET 24b is equal to the voltage V2 and current flows between the drain and a source of the P-channel FET 24b, generating heat.

As described above, heat may be generated by the voltages V1 and V2 in the N-channel and P-channel FETs 24a and 24b, thereby deteriorating overall drive efficiency.

Also, in a case where the first driving signal S1 is at a low level, the first diode 22a is forwardly biased. Here, electric charges in the internal capacitor of the N-channel FET 24a enter the controller 10 through the first diode 22b, disadvantageously heating the controller 10.

SUMMARY OF THE INVENTION

The present invention has been provided to solve the foregoing problems of the prior art and therefore an aspect of the present invention is to provide an inverter driving circuit for an LCD backlight which has less current flowing in a switch during off operation to be switched on/off stably and allows less heat to be generated, thereby enhancing drive efficiency.

According to an aspect of the invention, the invention provides an inverter driving circuit for a liquid crystal display backlight. The circuit includes a controller supplying a first driving signal of a square wave; a level shifter boosting up and shifting the first driving signal of the controller into a second driving signal; a first delay circuit comprising a first resistor having one end connected to an output terminal of the first driving signal and a first switch connected between another end of the first resistor and a ground and turned on when the first driving signal is at a low level, the first delay circuit delaying a rising section of the first driving signal to provide the first driving signal; a second delay circuit comprising a second resistor having one end connected to an output terminal of the second driving signal of the level shifter and a second switch connected between another end of the second resistor and a power supply and turned on when the second driving signal is at a high level, the second delay circuit delaying a falling section of the second driving signal to provide the second driving signal; and a power switching circuit including a third switch switching on/off in response to the first driving signal of the first delay circuit and a fourth switch switching on/off differentially from the third switch in response to the second driving signal of the second delay circuit, the third and fourth switches connected in series between the power supply and the ground.

The first delay circuit delays the rising section of the first driving signal by a delay time determined by a resistance of the first resistor and an internal capacitance of the third switch.

The second delay circuit delays the falling section of the second driving signal by a delay time determined by a resistance of the second resistor an internal capacitor of the fourth switch.

The first switch is a PNP transistor having a base connected to the one end of the first resistor, an emitter connected to the another end of the first resistor and a collector connected to the ground.

The second switch is an NPN transistor having a base connected to the one end of the second resistor, a collector connected to the power supply, and an emitter connected to the another end of the second resistor.

The third switch is an N-channel field effect transistor having a drain connected to the fourth switch, a gate connected to the another end of the first resistor and a source connected to the ground.

The fourth switch is a P-channel field effect transistor having a drain connected to the power supply, a gate connected to the another end of the second resistor, and a source connected to the third switch.

The level shifter includes a capacitor having one end connected to the output terminal of the first driving signal of the controller; a Zener diode having a cathode connected to the power supply and an anode connected to another end of the capacitor; and a third resistor connected in parallel with the Zener diode, wherein the second driving signal is provided from the anode of the Zener diode connected to the another end of the capacitor.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 4:
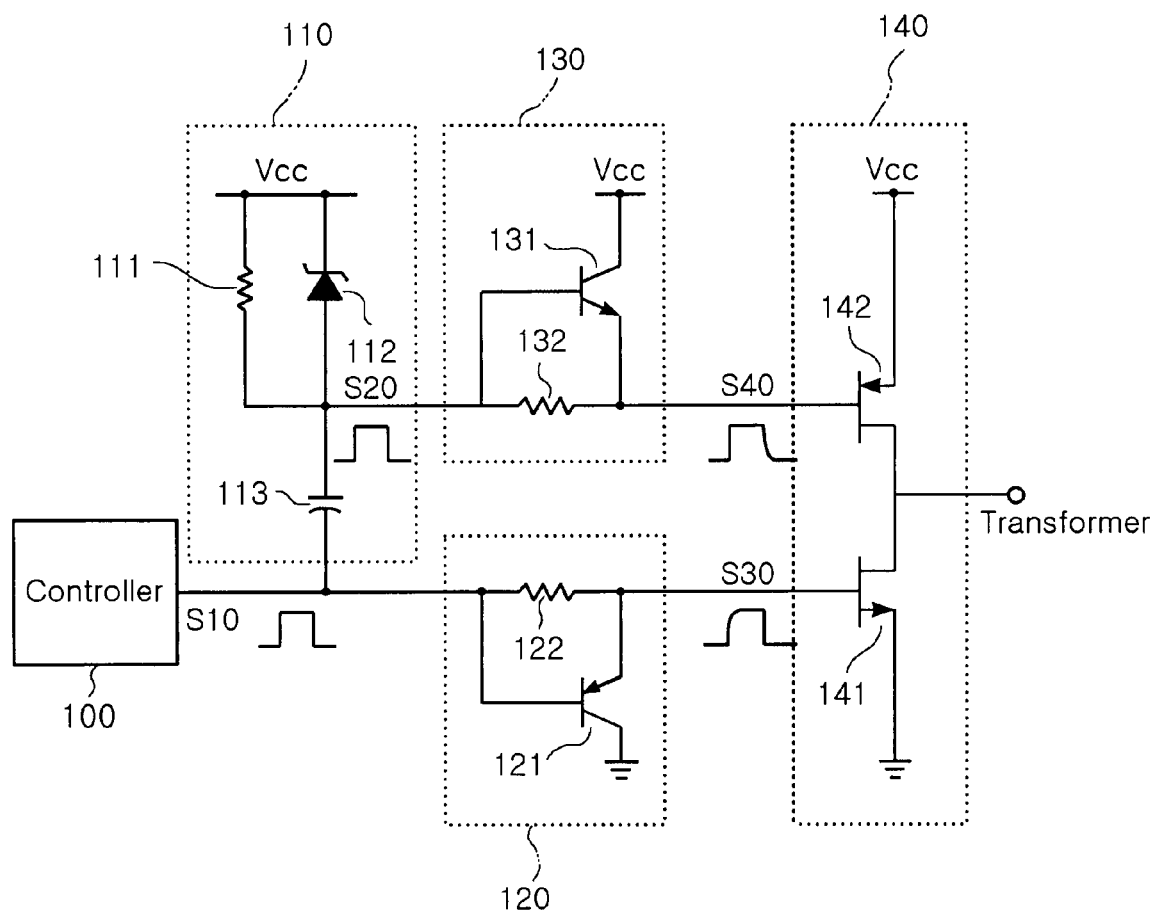
FIG. 4 is a block diagram illustrating an inverter driving circuit for an LCD backlight according to the invention.

FIG. 4 is a diagram illustrating an inverter driving circuit for an LCD backlight according to an exemplary embodiment of the invention.

Referring to FIG. 4, the inverter driving circuit for the LCD backlight includes a controller 100 supplying a first driving signal S10 of a square wave and a level shifter 110 boosting up and shifting the first driving signal S10 of the controller 100 into a second driving signal S20.

Also, the inverter driving circuit for the LCD backlight according to the present embodiment includes a first delay circuit 120. The first delay circuit 120 includes a first resistor 122 having one end connected to an output terminal of the first driving signal S20 of the controller 100 and a first switch 121 connected between another end of the first resistor 122 and a ground and turned on when the first driving signal S10 is a low level. The first delay circuit 120 delays a rising section of the first driving signal S10 to provide the first driving signal S10 from the another end of the first resistor 122.

The inverter driving circuit for the LCD backlight according to the present embodiment includes a second delay circuit 130. The second delay circuit 130 includes a second resistor 132 having one end connected to an output terminal of the second driving signal S20 of the level shifter 110 and a second switch 131 connected between another end of the second resistor 132 and a power supply Vcc and turned on when the second driving signal S20 is at a high level. The second delay circuit 130 delays a falling section of the second driving signal S20 to provide the second driving signal S20 from the another end of the second resistor 132.

Moreover, the inverter driving circuit for the LCD backlight includes a power switching circuit 140. The power switching circuit 140 includes a third switch 141 and a fourth switch 142. The third switch 141 switches on/off in response to the driving signal S30 of the first delay circuit 120. The fourth switch 142 switches on/off differentially from the third switch 141 in response to the driving signal S40 of the second delay circuit 130. The third and fourth switches 141 and 142 are connected in series with each other between the power supply and the ground.

The level shifter 110 includes a capacitor 113, a Zener diode 112 and a third resistor 111. The capacitor 113 has one end connected to the output terminal of the first driving signal S10 of the controller 100. The Zener diode 112 has a cathode connected to the power supply Vcc and an anode connected to another end of the capacitor 113. The third resistor 111 is connected in parallel with the Zener diode 112.

A second driving signal S20 is provided by the level shifter 110 from the anode of the Zener diode 112 connected to the another end of the capacitor 113.

The first delay circuit 120 delays the rising section of the first driving signal S10 by a delay time determined by the first resistor 122 and an internal capacitor of the third switch 141 and provides the driving signal S30 whose rising section is delayed, to the third switch 141.

The first switch 121 of the first delay circuit 120 may be formed of a PNP transistor 121 having a base connected to the one end of the first resistor 122, an emitter connected to the another end of the first resistor 122 and a collector connected to the ground.

The second delay circuit 130 delays the falling section of the second driving signal S20 by a delay time determined by the second resistor 132 and an internal capacitor of the fourth switch 142, and provides the driving signal S40 whose falling section is delayed, to the fourth switch 142.

The second switch 131 of the second delay circuit 130 may be formed of an NPN transistor 131 having a base connected to the one end of the second resistor 132, a collector connected to the driving voltage Vcc, and an emitter connected to the another end of the second resistor 132.

The third switch 141 of the power switching circuit 140 maybe formed of an N-channel field effect transistor (FET) 141 having a drain connected to the fourth switch 142, a gate connected to the another end of the first resistor 122 and a source connected to the ground.

The fourth switch 142 of the power switching circuit 140 may be formed of a P-channel FET 142 having a drain connected to the power supply Vcc, a gate connected to the another end of the second resistor 132, and a source connected to the third switch 141.

The third and fourth switches 141 and 142 are not limited to an FET but may be formed as a three-terminal switch such as a silicon controlled rectifier (SCR) and a bipolar junction transistor (BJT).

Figure 5:
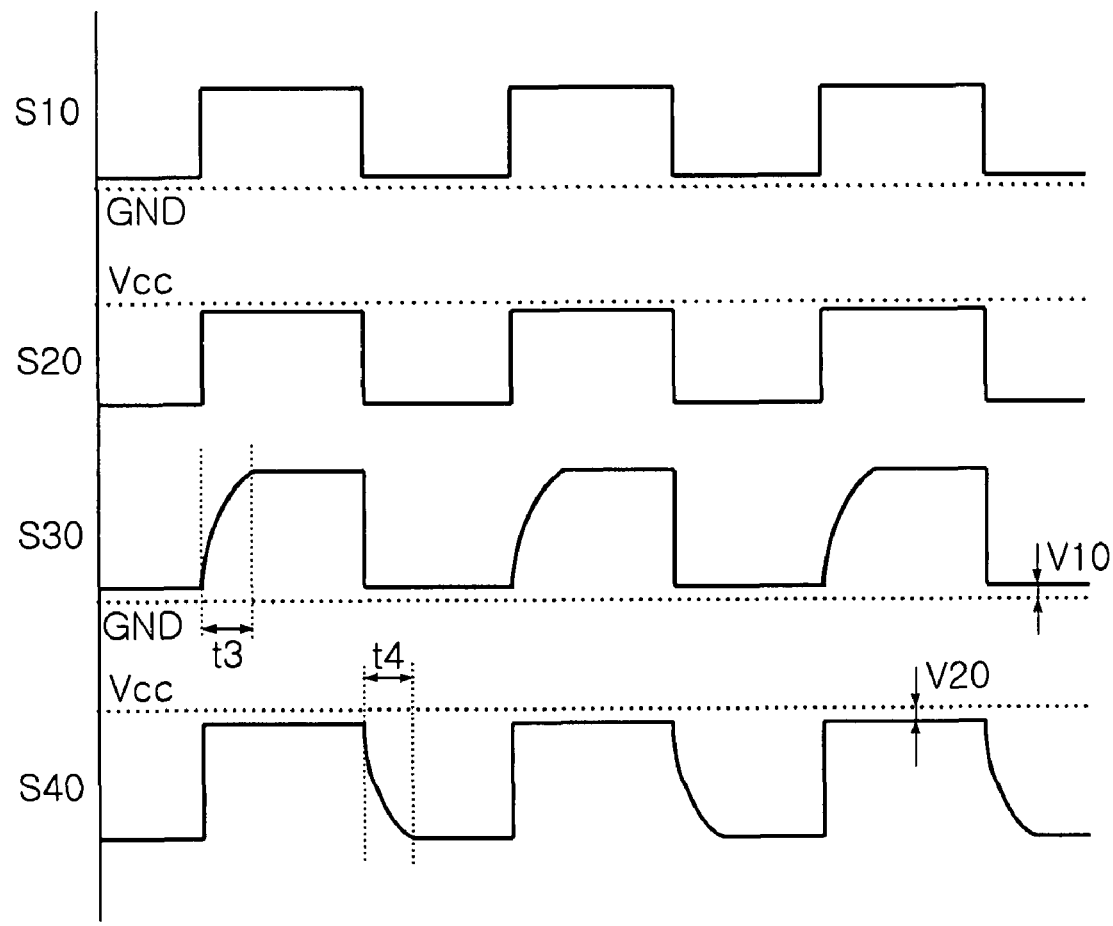
FIG. 5 is a timing diagram illustrating an inverter driving signal for an LCD backlight according to the invention.

FIG. 5 is a timing diagram illustrating the inverter driving signal for the LCD backlight according to an exemplary embodiment of the invention. Referring to FIG. 5, S10 denotes a first driving signal outputted from the controller 100. S20 denotes a second driving signal outputted from the level shifter 110. S30 denotes a signal obtained by delaying of the rising section of the first driving signal S10 by the first delay circuit 120. S40 denotes a signal obtained by delaying of the falling section of the second driving signal S20 by the second delay circuit 130.

Figure 1:
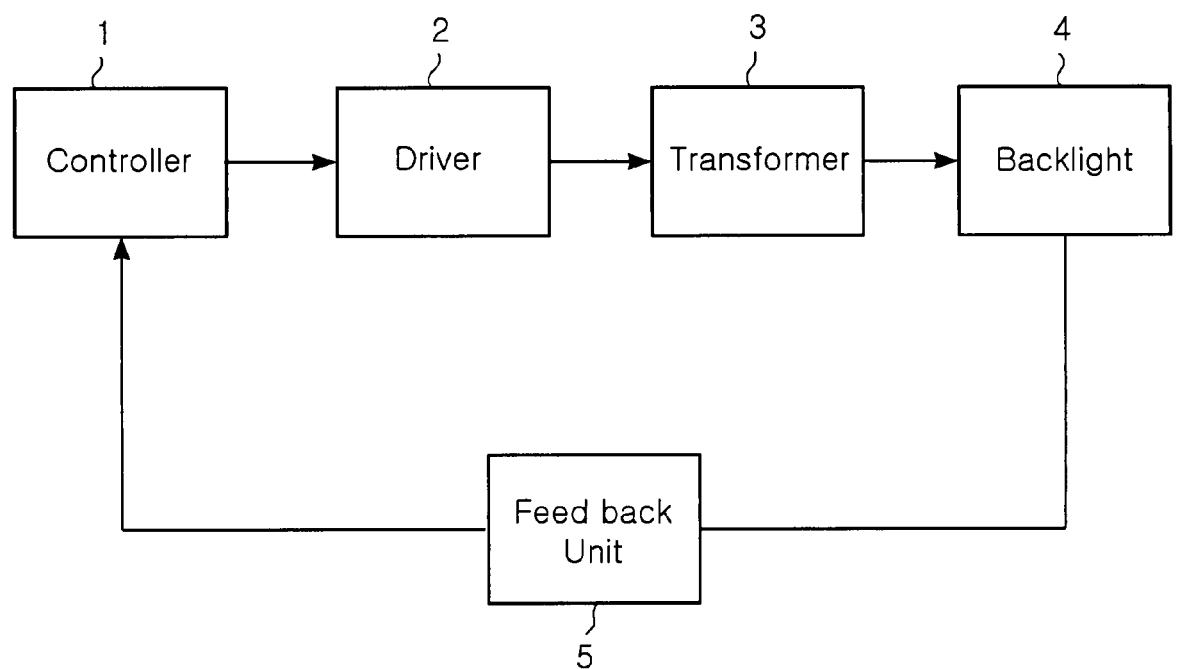
FIG. 1 is a block diagram illustrating a conventional LCD backlight inverter.
Figure 2:
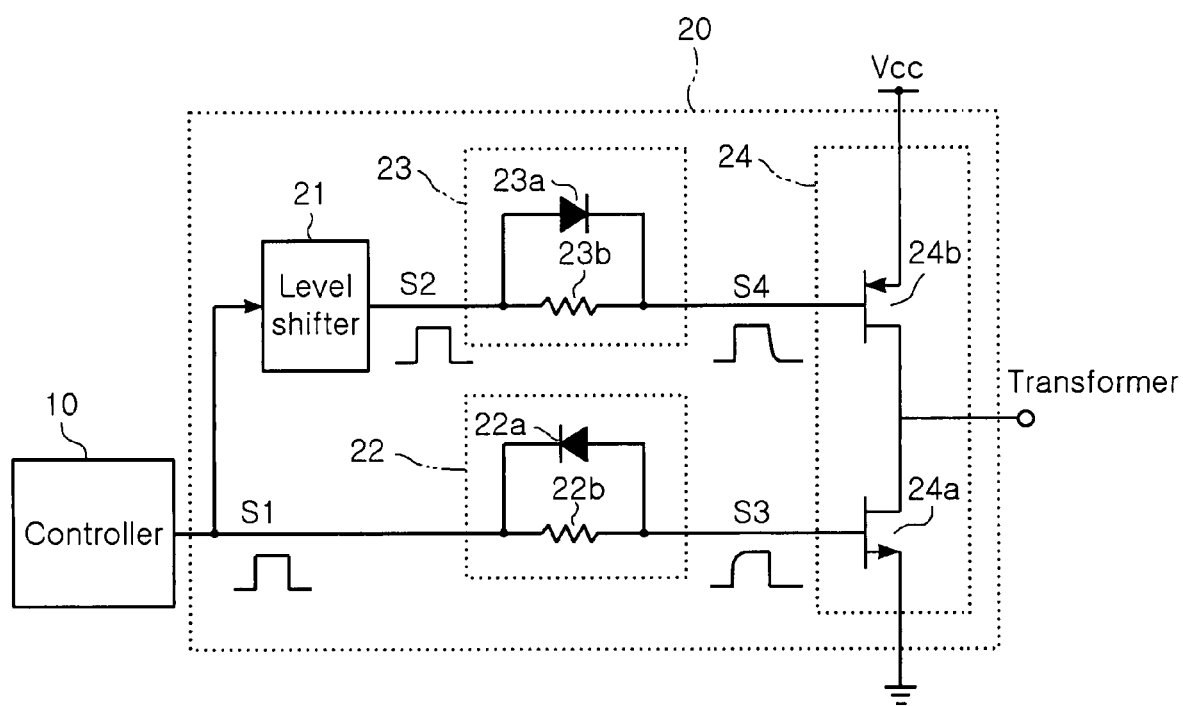
FIG. 2 is a block diagram illustrating a conventional inverter driving circuit for an LCD backlight.
Figure 3:
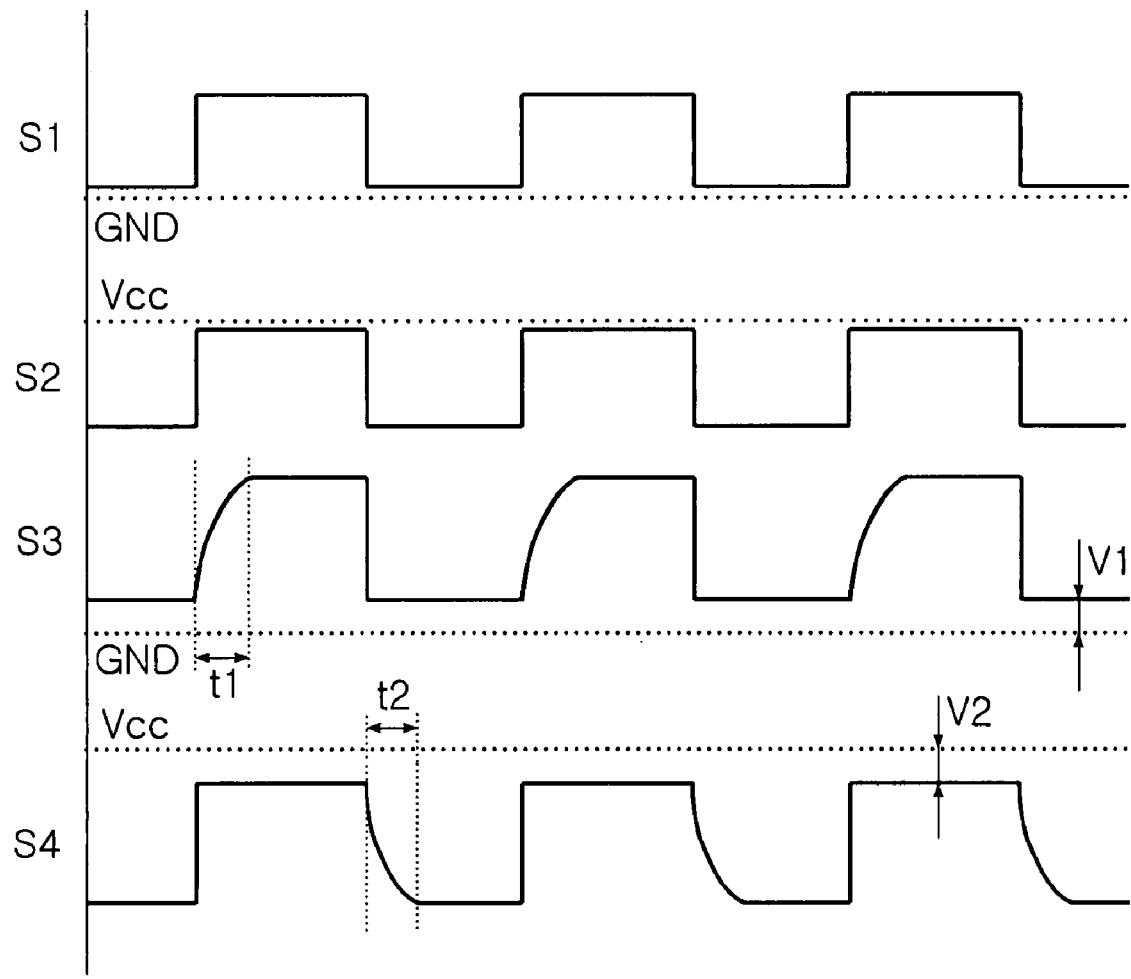
FIG. 3 is a timing diagram illustrating a driving signal of a conventional inverter driving circuit for an LCD backlight.

FIGS. 6a and 6b are graphs illustrating voltage levels of the driving signals shown in FIGS. 2 and 4.

FIG. 6a illustrates a voltage level of a signal S3 obtained by delaying of the rising section of the first driving signal S1 according to the prior art and a voltage level of a signal S30 obtained by delaying of the rising section of the first driving signal S10 according to an exemplary embodiment of the invention.

FIG. 6b illustrates a voltage level of a signal S4 obtained by delaying of the falling section of the second driving signal S2 according to the prior art and a voltage level of a signal S40 obtained by delaying of the falling section of the second driving signal S20 according to an exemplary embodiment.

Hereinafter, operations and effects of the invention will be described in detail.

Referring to FIG. 4, the controller 100 of the inverter driving circuit for the LCD backlight according to an exemplary embodiment of the invention generates a first driving signal S10 of a square wave to provide to the level shifter 110 and the first delay circuit 120. The level shifter 110 boosts up and shifts the first driving signal S10 into a second driving signal S20 to provide to the second delay circuit 130.

An explanation will be given about generation of the second driving signal S10 by the level shifter 110.

The capacitor 113 of the level shifter 110 has one end connected to the controller 100 to receive the first driving signal S10. In general, a capacitor is not drastically changed in its voltage. Therefore, the second driving signal S20 generated from another end of the capacitor 113 connected to the Zener diode 112 has a voltage level greater than the first driving signal S10 by a certain value. Yet, the second driving signal S20 is identical in waveform and phase to the first driving signal S10.

If the first driving signal S10 is at a high level, the second driving signal S20 has a voltage level substantially the same as the power supply Vcc. Meanwhile, if the first driving signal S10 is at a low level, the second driving signal S20 has a voltage level lower than the power supply Vcc by a certain value.

The first driving signal S10 and the second driving signal S20 will be described in detail with reference to FIG. 5. The first driving signal S10 has a low level and a high level alternating periodically with each other. The low level of the first driving signal S10 is substantially identical to a ground voltage and the high level thereof is greater than the ground voltage by a certain value.

The second driving signal S20 has the same waveform and phase as the first driving signal S10. That is, if the first driving signal S10 is at a low level, the second driving signal S20 is also at a low level. In contrast, if the first driving signal S10 is at a high level, the second driving signal S20 is also at a high level.

However, the second driving signal S20 and the first driving signal S10 differ in voltage levels. That is, if the second driving signal S20 is at a high level, the first driving signal S10 has a voltage level substantially the same as the driving voltage Vcc. If the second driving signal is at a low level, the first driving signal S10 has a voltage level lower than the driving voltage by a certain value.

Operation of the first delay circuit 120 will be described with reference back to FIG. 4. The first driving signal S10 is provided to the first delay circuit 120. The first switch 121 of the first delay circuit 120 is turned on when the first driving signal S10 is at a low level and turned off when the first driving signal S10 is at a high level. In the rising section where the first driving signal S20 transits from a low level to a high level, the first switch 121 is turned off from "ON" and the first driving signal S10 is provided to the third switch 141.

Accordingly, an RC circuit is formed by the first resistor 122 of the first delay circuit 120 and the internal capacitor of the third switch 141. The signal S30 is delayed by a delay time determined by a resistance of the first resistor 122 and a capacitance of the internal capacitor of the third switch 141, and then transits from a low level to a high level.

If the first driving signal S10 transits from a high level to a low level, the first switch 121 is turned on from "OFF." If the first switch 121 is turned on, the signal S30 provided to the third switch 141 transits from a high level to a low level without delay. Here, the signal S30 has a voltage equal to a voltage between an emitter and collector of the first switch 121.

As described above, the first delay circuit 120 delays the rising section of the first driving signal S10 and provides a high level signal to the third switch 141.

The rising and falling sections of the signal S30 as described above will be described with reference to FIG. 5.

When the first driving signal S10 transits from a low level to a high level in the rising section, the signal S30 is delayed by a delay time t3 determined by the first resistor 122 and the internal capacitor of the third switch 141 and then transits from a low level to a high level. But when the first driving signal S10 transits from a high level to a low level in the falling section, the signal S30 transits from a high level to a low level without delay. Here, a voltage V10 between the signal 30 at a low level and the ground is maintained at about 0.3V which is a voltage between the emitter and collector of the first switch 121. Electric potential of the signal S30 at a low level will be described later.

Operation of the second delay circuit 130 will be described with reference back to FIG. 4. The second driving signal S20 is provided to the second delay circuit 130. The second switch 131 of the second delay circuit 130 is turned on when the second driving signal S20 is at a high level and turned off when the second driving signal S20 is at a low level. In the falling section where the second driving signal S20 transits from a high level to a low level, the second switch 131 is turned off from "ON" and the second driving signal S20 is provided to the fourth switch 142. Accordingly, an RC circuit is formed by the second resistor 132 of the second delay circuit 130 and the internal capacitor of the fourth switch 142. The signal S40 is delayed by a delay time determined by a resistance of the second resistor 132 and a capacitance of the internal capacitor of the fourth switch 142 and then transits from a high level to a low level.

If the second driving signal S20 transits from a low level to a high level, the second switch 132 is turned off from "OFF." If the second switch 131 is turned on, the signal S40 provided to the fourth switch 142 transits from a high level to a low level without delay. Here, the signal S40 has a voltage level lower than the power supply Vcc by a level of a voltage between a collector and emitter of the second switch 131.

As described above, the second delay circuit 130 delays the falling section of the second driving signal S20 and provides a high level signal to the fourth switch 142.

The rising and falling sections of the signal S40 will be described with reference to FIG. 5.

When the second driving signal S20 transits from a low level to a high level in the rising section, the signal S40 is delayed by a delay time t4 determined by the second resistor 132 and the internal capacitor of the fourth switch and then transits from a high level to a low level. However, when the second driving signal S20 transits from a low level to a high level in the falling section, the signal S40 transits from a low level to a high level without delay. Here, a voltage V20 between the signal S40 at a high level and the power supply Vcc is maintained at about 0.3V which is a voltage between the collector and emitter of the second switch 131. Therefore, the signal S40 has a voltage level from Vcc to 0.3V at a high level. Electric potential of the signal S40 at a high level will be described later.

As described above, the third and fourth switches 141 and 142 operate with delay times t3 and t4, respectively, thereby prevented from being turned on simultaneously. This accordingly prevents the third and fourth switches 141 and 142 from being destroyed.

Figure 6:
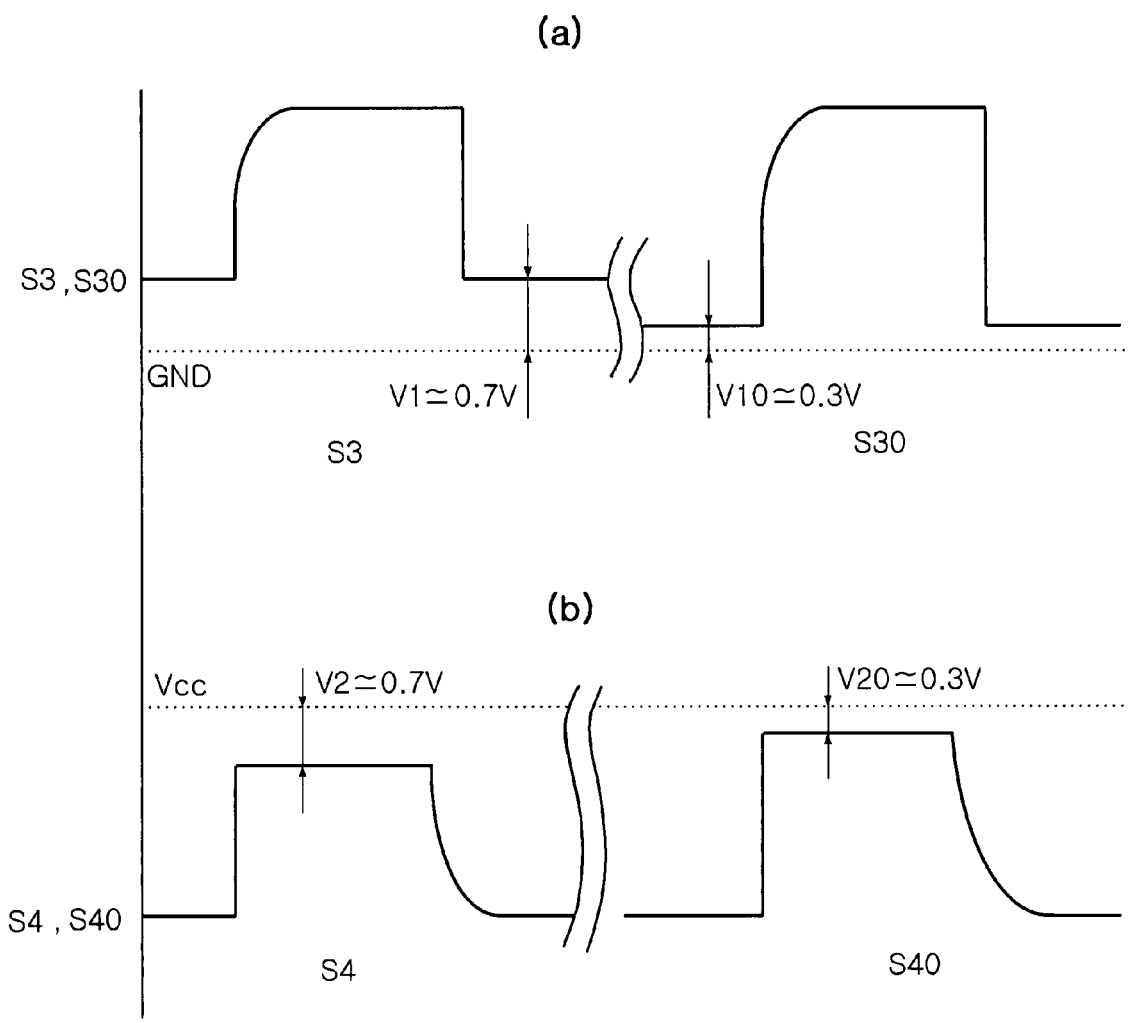
FIGS. 6a and 6b are graphs illustrating a comparison result of voltage levels of driving signals shown in FIG. 2 and FIG. 4.

A detailed explanation will be given about electric potential of the signal S30 at a low level and electric potential of the signal S40 at a high level with reference to FIG. 6.

As described above, in the conventional inverter driving circuit for the LCD backlight, the driving signal S3 driving the N-channel FET 24a has an electric potential of 0.7V at a low level. Meanwhile, in the inverter driving circuit for the LCD backlight according to an exemplary embodiment of the invention, the driving circuit S30 driving the third switch 141 has a relatively low electric potential of 0.3V at a low level.

Also, in the conventional inverter driving circuit for the LCD backlight, the driving signal S4 driving the P-channel FET 24b has an electric potential ranging from Vcc to 0.7V at a low level. Meanwhile, the inverter driving circuit for the LCD backlight according to the embodiment of the invention, the driving signal S40 driving the fourth switch 142 has a higher electric potential ranging from Vcc to 0.3V at a high level.

Therefore, these voltages allow less current to flow in the third switch 141 and the fourth switch 142, thereby generating less heat.

Referring back to FIG. 4, in a case where the first switch 121 is turned on, the gate of the third switch 141 is connected to the ground via the turned-on first switch 121. Here, electric charges in the internal capacitor of the third switch 141 are discharged toward the ground via the first switch 121, bypassing the first resistor 122. Therefore, the electric charges in the internal capacitor of the third switch 141 are prevented from entering the controller 100, thereby protecting the controller 100.

As set forth above, according to exemplary embodiments of the invention, in a case where a switching device is turned off in an inverter driving circuit for an LCD backlight, less current flows in the switching device, thereby generating less heat. Also, current is prevented from flowing reversely in the switching device, thereby not generating heat. This improves drive efficiency of the inverter driving circuit for the LCD backlight.

While the present invention has been shown and described in connection with the preferred embodiments, it will be apparent to those skilled in the art that modifications and variations can be made without departing from the spirit and scope of the invention as defined by the appended claims.

What is claimed is:

1. An inverter driving circuit for a liquid crystal display backlight, the circuit comprising:
   a controller supplying a first driving signal of a square wave;
   a level shifter boosting up and shifting the first driving signal of the controller into a second driving signal;
   a first delay circuit comprising a first resistor having one end connected to an output terminal of the first driving signal and a first switch connected between another end of the first resistor and a ground and turned on when the first driving signal is at a low level, the first delay circuit delaying a rising section of the first driving signal to provide the first driving signal;
   a second delay circuit comprising a second resistor having one end connected to an output terminal of the second driving signal of the level shifter and a second switch connected between another end of the second resistor and a power supply and turned on when the second driving signal is at a high level, the second delay circuit delaying a falling section of the second driving signal to provide the second driving signal; and
   a power switching circuit comprising a third switch switching on/off in response to the first driving signal of the first delay circuit and a fourth switch switching on/off differentially from the third switch in response to the second driving signal of the second delay circuit, the third and fourth switches connected in series between the power supply and the ground.

2. The inverter driving circuit of claim 1, wherein the first delay circuit delays the rising section of the first driving signal by a delay time determined by a resistance of the first resistor and an internal capacitance of the third switch.

3. The inverter driving circuit of claim 1, wherein the second delay circuit delays the falling section of the second driving signal by a delay time determined by a resistance of the second resistor an internal capacitor of the fourth switch.

4. The inverter driving circuit of claim 1, wherein the first switch is a PNP transistor having a base connected to the one end of the first resistor, an emitter connected to the another end of the first resistor and a collector connected to the ground.

5. The inverter driving circuit of claim 1, wherein the second switch is an NPN transistor having a base connected to the one end of the second resistor, a collector connected to the power supply, and an emitter connected to the another end of the second resistor.

6. The inverter driving circuit of claim 1, wherein the third switch is an N-channel field effect transistor having a drain connected to the fourth switch, a gate connected to the another end of the first resistor and a source connected to the ground.

7. The inverter driving circuit of claim 1, wherein the fourth switch is a P-channel field effect transistor having a drain connected to the power supply, a gate connected to the another end of the second resistor, and a source connected to the third switch.

8. The inverter driving circuit of claim 1, wherein the level shifter comprises:
   a capacitor having one end connected to the output terminal of the first driving signal of the controller;
   a Zener diode having a cathode connected to the power supply and an anode connected to another end of the capacitor; and
   a third resistor connected in parallel with the Zener diode,
   wherein the second driving signal is provided from the anode of the Zener diode connected to the another end of the capacitor.

* * * * *